US011082637B2

(12) United States Patent
Talmor Marcovici et al.

(10) Patent No.: US 11,082,637 B2
(45) Date of Patent: Aug. 3, 2021

(54) VIDEO PROCESSING IN VIRTUAL REALITY ENVIRONMENTS

(71) Applicant: Intel Corporation, Santa Clara, CA (US)

(72) Inventors: Sharon Talmor Marcovici, Kfar-Saba M (IL); Michael Glik, Kfar-Saba M (IL); Yaniv Frishman, Kiryat Ono M (IL); Elad Levy, Rishon Le Zion M (IL); Shani Ben-Haim, Haifa HA (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/022,060

(22) Filed: Jun. 28, 2018

(65) Prior Publication Data

US 2019/0045140 A1     Feb. 7, 2019

(51) Int. Cl.
*H04N 5/268*      (2006.01)
*H04N 5/14*       (2006.01)
(Continued)

(52) U.S. Cl.
CPC .............. *H04N 5/268* (2013.01); *G06F 3/012* (2013.01); *H04N 5/144* (2013.01); *H04N 19/85* (2014.11);
(Continued)

(58) Field of Classification Search
CPC ....................................................... H04N 5/144
(Continued)

(56) References Cited

U.S. PATENT DOCUMENTS 7,589,789 B2 *   9/2009   Choi ................... H04N 21/435
                                              348/441
7,809,942 B2    10/2010   Baran et al.
(Continued)

FOREIGN PATENT DOCUMENTS

WO      2008134897       11/2008

OTHER PUBLICATIONS

International Searching Authority, "Search Report," issued in connection with PCT patent application No. PCT/US2019/024254, dated Jul. 10, 2019, 4 pages.
(Continued)

*Primary Examiner* — John W Miller
*Assistant Examiner* — Sihar A Karwan
(74) *Attorney, Agent, or Firm* — Hanley, Flight & Zimmerman, LLC (57) ABSTRACT

Apparatus, systems, articles of manufacture, and methods for processing video in virtual reality environments are disclosed. An example virtual reality display device to process video in a virtual reality environment includes a video analyzer to detect unsmooth video data in the stream of video data and a video library to provide alternative video data. The example device also includes a selector to receive the stream of video data, an indication of the unsmooth video data, and the alternative video data. The selector is to select the alternative video data to replace the unsmooth video data based on the indication of the unsmooth video data and output a modified stream of video data including the stream of video data with the alternative video data in place of the unsmooth video data. The example device also includes an output display to display the modified stream of video data.

18 Claims, 7 Drawing Sheets

(51) Int. Cl.
  *G06F 3/01* (2006.01)
  *H04N 21/442* (2011.01)
  *H04N 21/41* (2011.01)
  *H04N 21/44* (2011.01)
  *H04N 19/85* (2014.01)
  *H04N 21/4363* (2011.01)
  *H04N 21/81* (2011.01)
  *H04N 19/44* (2014.01)
  *H04N 19/164* (2014.01)

(52) U.S. Cl.
  CPC ... *H04N 21/4122* (2013.01); *H04N 21/43637* (2013.01); *H04N 21/44008* (2013.01); *H04N 21/44016* (2013.01); *H04N 21/44209* (2013.01); *H04N 21/816* (2013.01); *H04N 21/8146* (2013.01); *H04N 19/164* (2014.11); *H04N 19/44* (2014.11)

(58) Field of Classification Search
  USPC ......................................................... 725/142
  See application file for complete search history.

(56) References Cited

U.S. PATENT DOCUMENTS

| | | | |
|---|---|---|---|
| 7,948,481 B2 | 5/2011 | Vilcovsky | |
| 8,191,101 B2 | 5/2012 | Baran et al. | |
| 8,624,883 B2 | 1/2014 | Vilcovsky | |
| 8,823,631 B2 * | 9/2014 | Tomikawa | G09G 3/2092 345/102 |
| 8,897,553 B2 | 11/2014 | Lee | |
| 8,970,569 B2 | 3/2015 | Vilcovsky et al. | |
| 8,976,160 B2 | 3/2015 | Vilcovsky et al. | |
| 8,982,109 B2 | 3/2015 | Vilcovsky et al. | |
| 8,982,110 B2 | 3/2015 | Saban et al. | |
| 9,269,157 B2 | 2/2016 | Saban et al. | |
| 9,369,638 B2 | 6/2016 | Saban et al. | |
| 9,613,290 B2 | 4/2017 | Lee | |
| 10,085,005 B2 | 9/2018 | Pitts et al. | |
| 10,109,315 B2 | 10/2018 | Saban et al. | |
| 2003/0200548 A1 | 10/2003 | Baran et al. | |
| 2005/0039212 A1 | 2/2005 | Baran et al. | |
| 2005/0108763 A1 | 5/2005 | Baran et al. | |
| 2005/0198679 A1 * | 9/2005 | Baran | H04L 63/10 725/88 |
| 2005/0198680 A1 | 9/2005 | Baran et al. | |
| 2005/0262537 A1 | 11/2005 | Baran et al. | |
| 2008/0151092 A1 | 6/2008 | Vilcovsky | |
| 2010/0011397 A1 | 1/2010 | Baran et al. | |
| 2011/0199294 A1 | 8/2011 | Vilcovsky | |
| 2013/0148883 A1 | 6/2013 | Lee | |
| 2013/0229482 A1 | 9/2013 | Vilcovsky et al. | |
| 2014/0225977 A1 | 8/2014 | Vilcovsky et al. | |
| 2014/0225978 A1 | 8/2014 | Saban et al. | |
| 2014/0226000 A1 | 8/2014 | Vilcovsky et al. | |
| 2014/0226900 A1 | 8/2014 | Saban et al. | |
| 2015/0078658 A1 | 3/2015 | Lee | |
| 2016/0080662 A1 | 3/2016 | Saban et al. | |
| 2016/0127710 A1 | 5/2016 | Saban et al. | |
| 2016/0307372 A1 | 10/2016 | Pitts et al. | |
| 2016/0309065 A1 | 10/2016 | Karafin et al. | |
| 2017/0059305 A1 | 3/2017 | Nonn et al. | |
| 2017/0139131 A1 | 5/2017 | Karafin et al. | |
| 2017/0237971 A1 | 8/2017 | Pitts | |
| 2017/0243373 A1 | 8/2017 | Bevensee et al. | |
| 2017/0244948 A1 | 8/2017 | Pang et al. | |
| 2017/0365068 A1 | 12/2017 | Tan et al. | |
| 2018/0020204 A1 * | 1/2018 | Pang | H04N 13/232 |
| 2018/0033209 A1 | 2/2018 | Akeley | |
| 2018/0035134 A1 | 2/2018 | Pang et al. | |
| 2018/0089903 A1 | 3/2018 | Pang et al. | |
| 2018/0097867 A1 | 4/2018 | Pang et al. | |

OTHER PUBLICATIONS

International Searching Authority, "Written Opinion," issued in connection with PCT patent application No. PCT/US2019/024254, dated Jul. 10, 2019, 6 pages.

International Searching Authority, "International Preliminary Report on Patentability," issued in connection with PCT patent application No. PCT/US2019/024254, dated Dec. 29, 2020, 7 pages.

* cited by examiner

VIDEO PROCESSING IN VIRTUAL REALITY ENVIRONMENTS

FIELD OF THE DISCLOSURE

This disclosure relates generally to virtual reality, and, more particularly, to systems, apparatus, methods, and articles of manufacture for processing video in virtual reality environments.

BACKGROUND

In virtual reality, unlike other video streaming applications, the video display covers the entire visual field of view of a user. Therefore, the user's visual system expects synchronization between the user's movement and visually perceived movement as displayed by the virtual reality video, otherwise the user may experience motion sickness.

BRIEF DESCRIPTION OF THE DRAWINGS

The figures are not to scale. Also, in general, the same reference numbers will be used throughout the drawing(s) and accompanying written description to refer to the same or like parts.

DETAILED DESCRIPTION

High-end virtual reality systems use wired connections to couple a head-mounted display worn by the user to a personal computer or other video source. With traditional, wired virtual reality systems, the wire breaks the user's experience of immersion in the virtual reality environment because when the user touches or otherwise feels the wire, the sensation, external to the virtual reality environment, removes the user from the virtual reality experience. The wire also tethers the user and limits the user's movement in space, which may also remove the user from the virtual reality experience. As used herein, the term "user" can refer to any gamer, subject, patient, or other person who uses the devices disclosed herein to experience a virtual reality environment. In addition, the terms "virtual reality" and "virtual reality environment" are used interchangeably throughout this disclosure. Also, the terms "video," "streaming video," "video data," and "stream of video data" are used interchangeably throughout this disclosure.

Wireless technology such as, for example, Wireless Gigabit Alliance (WiGig) technology has been implemented for use with virtual reality systems to enable users to experience virtual reality without the risk of having the virtual reality experience broken by touching the wire or by the spatial movement limitations due to the wire tether.

The key performance indicators for wireless virtual reality are low latency of video and motion tracking data. Low latency of the video is influential on the user experience because head-mounted displays have video panels that have high video resolution and high video frame rate, which operate at a high throughput of the encoded video. Motion tracking data also is relevant to the user experience because of the low motion-to-photon latency standards for virtual reality. Motion-to-photon latency is the time needed for a user movement to be fully reflected on a display screen. Low motion-to-photon latency convinces the user's mind that the user is in another place, which enhances the virtual reality experience. High motion-to-photon latency results in a virtual reality display lagging behind user movement, resulting in a poor virtual reality experience and/or motion sickness and nausea.

Wireless virtual reality systems have variable bandwidth capacity, which in some link conditions cannot deliver video bandwidth with sufficient low latency. When a video frame is not delivered in time to a video decoder of the head-mounted display (e.g., due to increased latency), the video decoder drops the late video frame. In this example, the user will view an unsmooth video display such as, for example, video juddering and/or image freezing. Unsmooth video data includes video data delivered outside of a latency constraint to cause the display to present video that is not fluid, seamless, or otherwise perceived without disruption or transmission issues. Thus, wireless virtual reality may impair a user's virtual experience in scenarios in which the wireless link cannot provide video with the expected or desired quality of service, i.e., within a latency constraint.

When the virtual reality video is unsmooth for relatively long periods of time (such as, for example, greater than about 300 milliseconds) and/or the virtual reality video has a perceived latency that is relatively too high (such as, for example, greater than about 10 milliseconds), the disagreement between a user's movement and a visually perceived movement on the head-mounted display is too strong. Therefore, the user experiences motion sickness including, for example, disorientation, dizziness, nausea, a headache, and/or other discomfort.

Some prior wireless virtual reality systems redisplay previous video frames when new video frame data has not arrived in-time due to latency issues or has not arrive at all (e.g., has been discarded) and cannot be decoded and presented on a display panel in the head-mounted display as desired. However, the redisplaying of prior video frames does not meet virtual reality user experience expectations because either perceived video latency is too high, or motion sickness is caused due to misalignment between head or other user movement and the image displayed. Other prior wireless virtual reality systems stop the video altogether, which may cause the display to turn black and may cause the user to feel discomfort and suspect system malfunction.

Disclosed herein are systems, apparatus, methods, and articles of manufacture for processing video in virtual reality environment. The video can be processed to eliminate elements (e.g., frames) that may cause motion sickness. To prevent the user from feeling sick and to improve overall wireless virtual reality experience, scenarios of reduced video performance are identified and concealed from the user by displaying alternative video in the head-mounted display. In examples disclosed herein, instances or moments of unsmooth virtual reality video (e.g., video juddering and/or image freezing) caused by a transport layer with variable bandwidth capacity are identified before display or during display to the user. The unsmooth virtual reality video to be displayed on head-mounted display video panels is replaced with alternative video data including, for example, a non-virtual reality alternative video display to prevent motion sickness to the virtual reality user. In some examples, the unsmooth virtual reality video is identified before the unsmooth video or alternative video is displayed to the user (e.g., during the display of other, smooth video). In addition, in some examples, the unsmooth virtual reality video is identified before display to the user when, for example, alternative video is displayed to the user and the continuing incoming video remains unsmooth. Also, in some examples, unsmooth video is displayed to the user and identified during the display and replaced with alternative video after display of the unsmooth video for a threshold amount of time.

In some examples, the non-virtual reality alternative video display is a solid color display. The solid color display may include a plurality of frames of a solid color. The solid color display is the same color for all pixels of the display. In some examples, the solid color display is a color with medium intensity of brightness. A high intensity may appear as a disruptive flash, and a low intensity may appear as a system malfunction. A solid color display provides a better user experience than the redisplaying of prior video frames or stopping the video altogether (which may cause the display to turn black and signify a system malfunction to the user). A solid color display does not have a focus plane. Therefore, a user in a virtual reality environment does not have a misalignment of the user's movement with the movement shown on the head-mounted display when a solid color is displayed. Because of the solid color display, as the user moves, the head-mounted display does not show a different or discontinuous movement because the user sees the solid color display. Therefore, there is no distraction, confusion, or disorientation, and motion sickness is prevented. On the other hand, a redisplay of a prior frame of virtual reality video data or a display of other unsmooth video misaligns with the user's movements and may cause motion sickness. A misalignment of as little as one frame of video may be noticeable to the user, and if the misalignment continues for several video frames, feelings of discomfort of motion sickness may result.

In some examples, the users are notified or otherwise instructed as to the significance of the solid color display. For example, the users may be notified that when the user observes a solid color display, there is no system malfunction but the user is in an area or otherwise experiencing bad reception with the wireless signals. Thus, the presence of a solid color display can prompt a user to move in an effort to increase signal quality. A solid color display of a color of medium intensity can be distinguished from a black display that could signify system malfunction.

Figure 1:
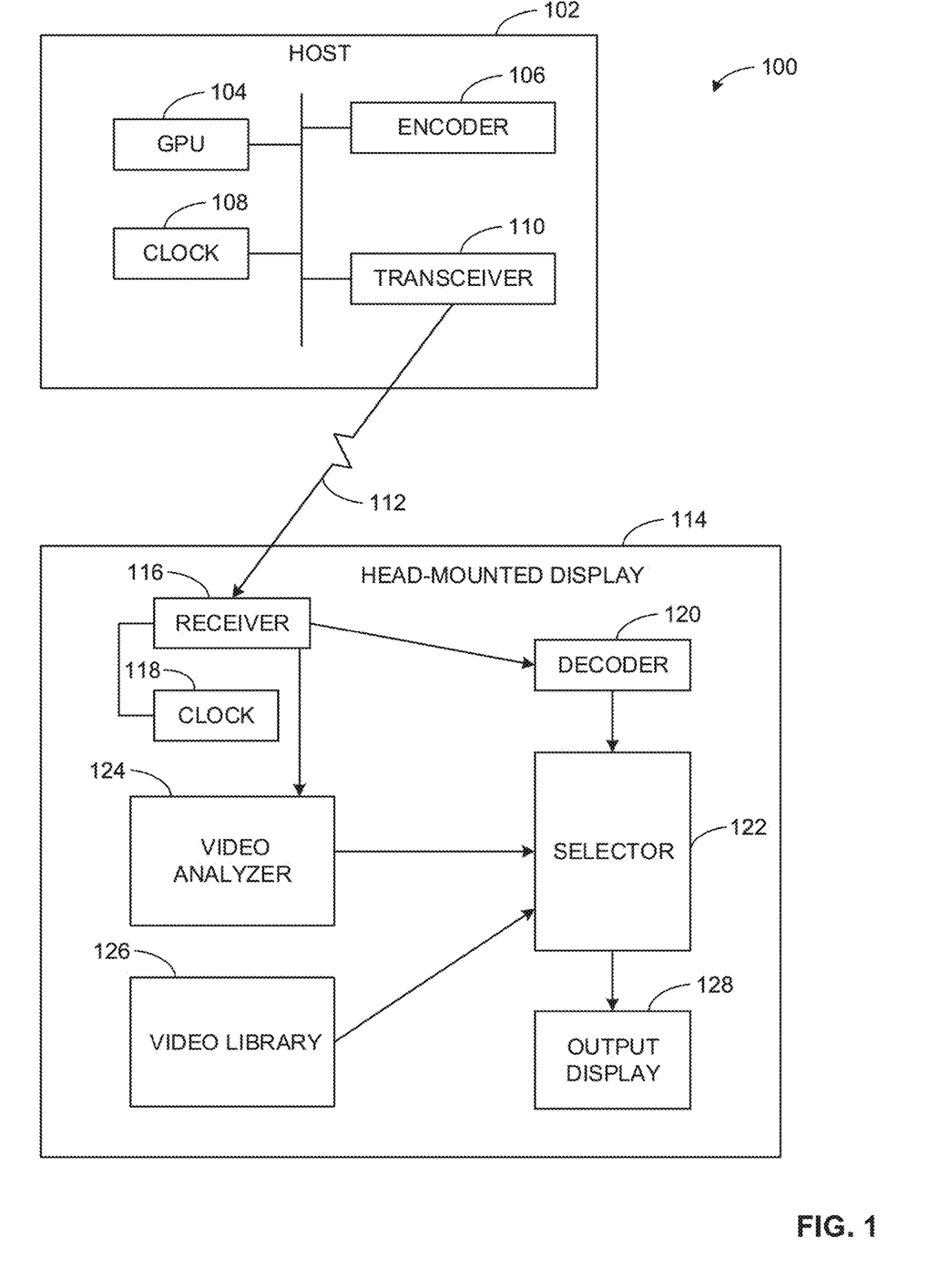
FIG. 1 is a block diagram of an example system for processing video in virtual reality environments in accordance with the teachings of this disclosure.

FIG. 1 is a block diagram of an example system 100 for processing video in virtual reality environments in accordance with the teachings of this disclosure. The example system 100 includes an example host 102. In this example, the host 102 includes an example graphics processing unit (GPU) 104, an example encoder 106, an example clock 108, and an example transceiver 110. The GPU 104 generates a stream video data including video frames that are encoded by the encoder 106. The clock 108 timestamps the stream video data encoded by the encoder 106. The stream of timestamped video data is transmitted via the transceiver 110 over a wireless link or transport layer 112 to an example head-mounted display 114.

The example head-mounted display 114 includes an example receiver 116, an example clock 118, an example decoder 120, an example selector 122, an example video analyzer 124, an example video library 126, and an example output display 128. In some examples, the receiver 116 (or other wireless radio) and the decoder 120 may be separate from the head-mounted display 114. In such examples, the components to make the head-mounted display 114 wireless will be an add-on kit separate from the head-mounted display 114. In other examples, these components are directly integrated into the head-mounted display 114.

The receiver 116 receives wireless communications including, for example, virtual reality video data including the stream of timestamped video data, over the wireless link 112 from the host 102. The clock 108, in communication with the receiver 116, timestamps the stream video data as the video data is received. Thus, the data is timestamped as the data both enters and exits the wireless link 112. The clock 108 of the host 102 and the clock 118 of the head-mounted display 114 are synchronized. The receiver 116 communicates the stream of video data, including the timestamps, to both the decoder 120 and the video analyzer 124. The decoder 120 decodes the stream video data and sends the decoded or uncompressed stream of video data to the selector 122.

The video analyzer 124 analyzes the stream of video data to determine if there are delays that will produce unsmooth video. In some examples, the video analyzer 124 determines the latency per packet by comparing the timestamp from the clock 108 of the host 102 with the timestamp from the clock 118 of the head-mounted display 114. The video analyzer 124 compares the latency per packet with transport layer latency budget to determine which packets are arriving in-time (i.e., within the latency budget). The transport layer latency budget is determined according to system configuration in which there is a pre-determined budget for additive wireless latency.

The video analyzer 124 compares the number of video packets arriving in-time (i.e., within the latency budget) to receiver 116 or the decoder 120 per time interval with the estimation of the number of packets expected in that time interval. Unsmooth video (due to missing video packets or video packets that do not arrive in-time) occurs when the number of packets arriving in-time (i.e., within the latency budget) in a time interval to the receiver 116 or the decoder 120 is less than expected in that time interval. The expected number of packets also depends on the encoded video structure, which is an implementation specific parameter that is application dependent and configured upon enumeration of the head-mounted display 114.

In some examples, the time intervals analyzed by the video analyzer 124 are sliding time windows. In some examples, the intervals partially overlap and the time windows progress as time moves forward. The video analyzer 124 also accounts for hysteresis when determining whether to classify a time window as unsmooth.

The video analyzer 124 classifies the time window by comparing the number of video packets received in-time (i.e., within the latency budget) during the time window to thresholds calculated based on estimation of the number of packets expected in that time window. This estimation is according to input parameters of the minimum number of packets per video frame and video frame rate. These input parameters are application dependent and configured upon enumeration of the head-mounted display 114.

For hysteresis purposes, two threshold number of packets are defined. The video analyzer 124 compares the number of video packets that arrive in-time during a time window and compares the number to a first threshold, which is a lower threshold that defines bad or unsmooth video. If an insufficient number of video packets arrive in-time during the time window to meet or exceed the first threshold (i.e., to meet or exceed the lower threshold), the window is classified as bad. If the number of video packets that arrive in-time during the time window meet or exceed the first threshold, the video analyzer 124 compares the number of video packets that arrive in-time during the time window to a second threshold, which is a higher threshold and which defines good or smooth video. If the number of in-time video packets meets or exceeds the second threshold (i.e., the minimal number of expected packets for good performance in that time period), the time window is classified as good. Otherwise, the video analyzer 124 determines that the number of in-time video packets meets or exceeds the first threshold but does not meet or exceed the second threshold and classifies the time window as neutral.

In some examples, the video analyzer 124 classifies a time window as having smooth/unsmooth virtual video by evaluating the activity of the decoder 120. For example, the video analyzer 124 compares the number of video frames arriving in-time to the decoder 120 per time interval or processed by the decoder 120 according to video frame presentation time, with the number of video frames expected in that time interval. If the number of frames received at or processed by the decoder 120 does not meet or exceed the expected number, the associated window may be classified as bad or unsmooth.

In some examples, the video analyzer 124 classifies a time window as having smooth/unsmooth virtual video by evaluating the wireless link 112. For example, the video analyzer 124 receives information related to the output of the video encoder 106 in the time window to establish a desired video throughput. The video analyzer 124 compares the desired video throughput for that time window with either (1) an effective physical layer (PHY) rate estimation in that time window (for example according to statistics based on Modulation and Coding Scheme (MCS), Packet Error Rate (PER), link outage periods, etc.) or (2) measurement of actual video throughput in that time window.

In some examples, the video analyzer 124 communicates a smooth or unsmooth status of video data for an interval to the selector 122. For example, the video analyzer 124 provides an indication of smooth, unsmooth, good, bad, neutral, etc. to the selector 122. In some examples, the video analyzer 124 communicates latency information to the selector 122 in addition to or alternatively to the smooth or unsmooth (or good/bad/neutral) status information.

When a scenario of relatively long periods of time (e.g., hundreds of milliseconds and/or based on a number of identified bad windows) in which video data is unsmooth is identified, the selector 122 selects alternative video data (e.g., solid color frame(s)) from the video library 126 to communicate to the output display 128 for display to user instead of unsmooth virtual reality video. In some examples, the alternative video data is faded-in and faded-out when returning to the virtual reality video display. In some examples, the selector 122 includes a multiplexer (MUX).

When the video analyzer 124 identifies or classifies a window as good and the output display 128 has a display of the decoded stream of video data, the selector 122 continues to output the decoded stream of video data to the output display 128. In some examples, when the video analyzer 124 identifies or classifies a window as good and the output display 128 has a display of alternative video data (e.g., a solid color display), the selector 122 changes the output from the alternative video data to the decoded stream of video data to the output display 128.

When the video analyzer 124 identifies or classifies a window as neutral, the selector 122 initiates no changes to the display at the output display 128.

In some examples, the alternative video has a minimum display time to improve user experience and prevent flickering video (e.g., turning the alternative video on/off in two or more successions) when there are borderline latency issues.

Figure 2A:
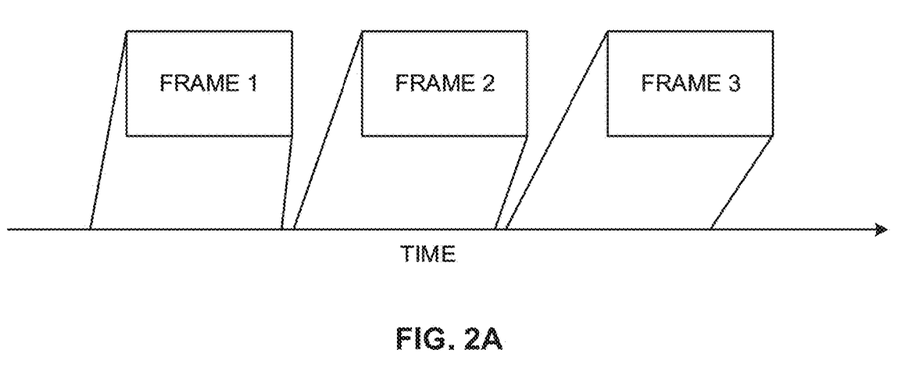
FIG. 2A is a block diagram of an example sequence of video frames.
Figure 2B:
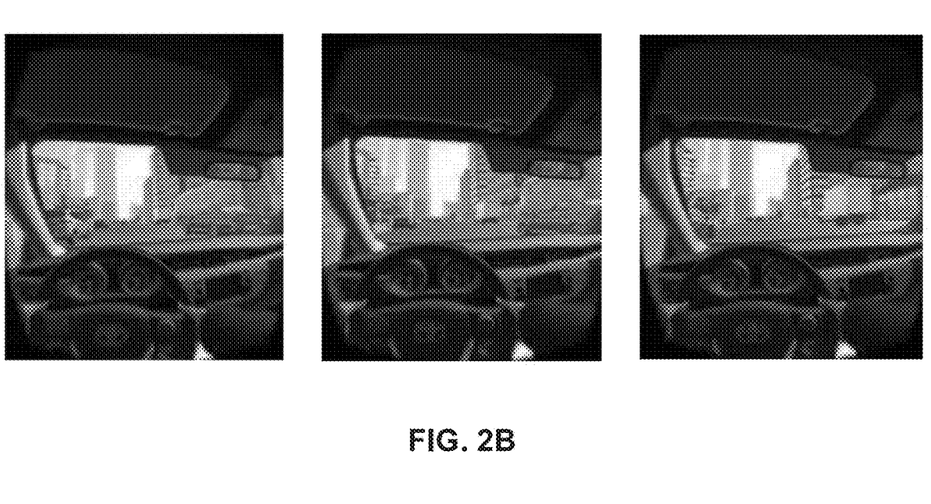
FIG. 2B is an illustration of video images of the video frames of FIG. 2A.

FIG. 2A is a block diagram of an example sequence of video frames. The time sequence of FIG. 2A does not include any latency problems. FIG. 2B is an illustration of video images of the video frames of FIG. 2A. In the virtual reality environment, the user would experience all the frames of FIGS. 2A and 2B.

Figure 3A:
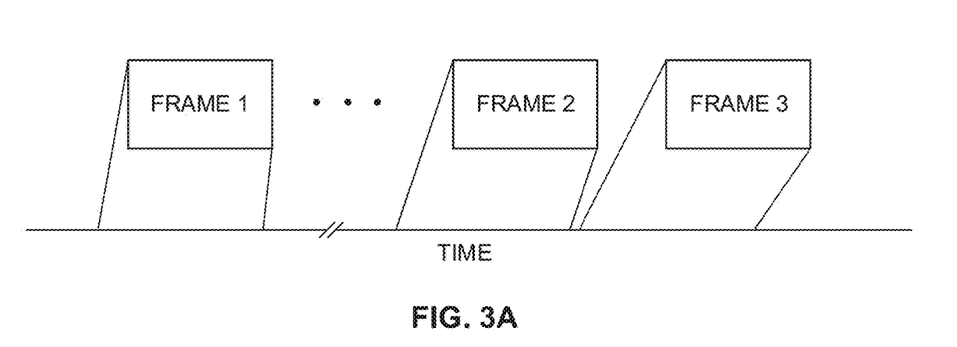
FIG. 3A is a block diagram of an example sequence of video frame that creates unsmooth video.

FIG. 3A is a block diagram of an example sequence of video frame that creates unsmooth video. In FIG. 3A, there are wireless latency issues and, therefore, the second frame is undesirably delayed. The corresponding video images from the sequence of video frames would appear unsmooth. For example, Frame 1 may appear to freeze until Frame 2 is received, decoded, and displayed.

Figure 3B:
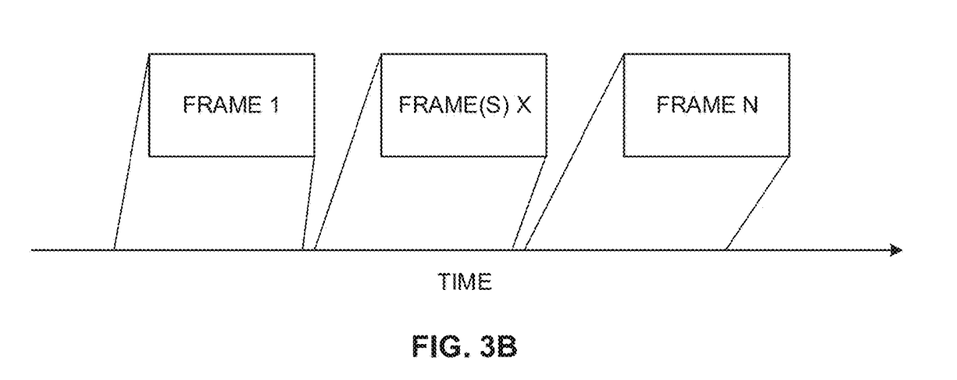
FIG. 3B is a block diagram of an example modified sequence of video frames.
Figure 3C:
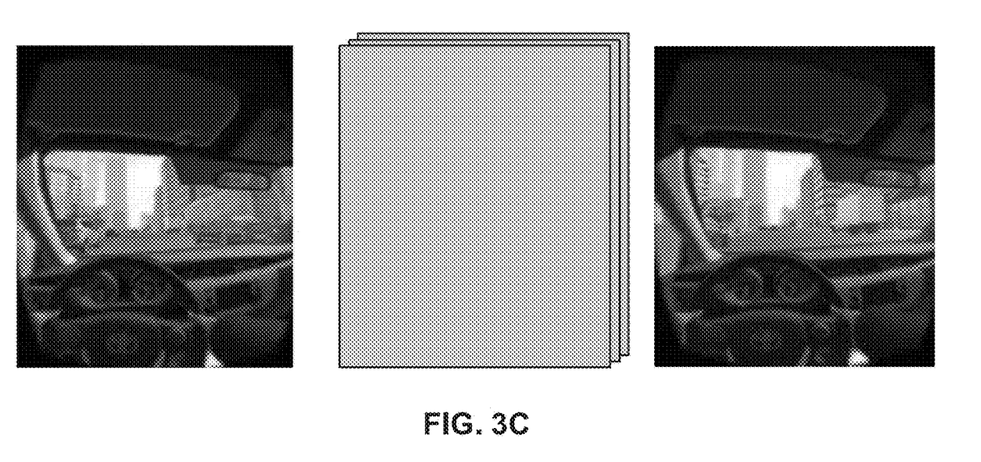
FIG. 3C is an illustration of video images of the video frames of FIG. 3B.

When the video analyzer 124 identifies that Frame 2 will cause unsmooth video, the information is sent to the selector 122, which selects alternative video data from the video library 126 to replace frame 2. FIG. 3B is a block diagram of an example modified sequence of video frames in which Frame 2 has been replaced with Frame(s) X, the alternative video. The alternative video may include a plurality of frames. After the alternative video (e.g., Frame(s) X), the smooth virtual reality video may continue with Frame N. Frame N in some examples is equivalent to Frame 3 so that the virtual reality video continues where it left off after the unsmooth video. In other examples, Frame N is a frame transmitted after Frame 3. FIG. 3C is an illustration of video images of the video frames of FIG. 3B. As shown in FIG. 3C, Frame(s) X is a solid color display, which in the example shown in FIG. 3C includes a plurality of frames. Though a grey color is shown in FIG. 3C, any color may be used. As disclosed herein, in some examples, a color or medium intensity of brightness is used.

Though there is a break in the virtual reality video data between Frame 1 and Frame 3 due to the insertion of Frame(s) X, Frame(s) X do not have a focal plane. Therefore, the user experiencing the modified video stream of FIGS. 3B and 3C would not experience motion sickness, nausea or other discomfort caused by unsmooth video (including juddering and image freezing) and or replacement video that would create a misalignment with the user's movements and the video displayed on the head-mounted display 114.

Figure 4A:
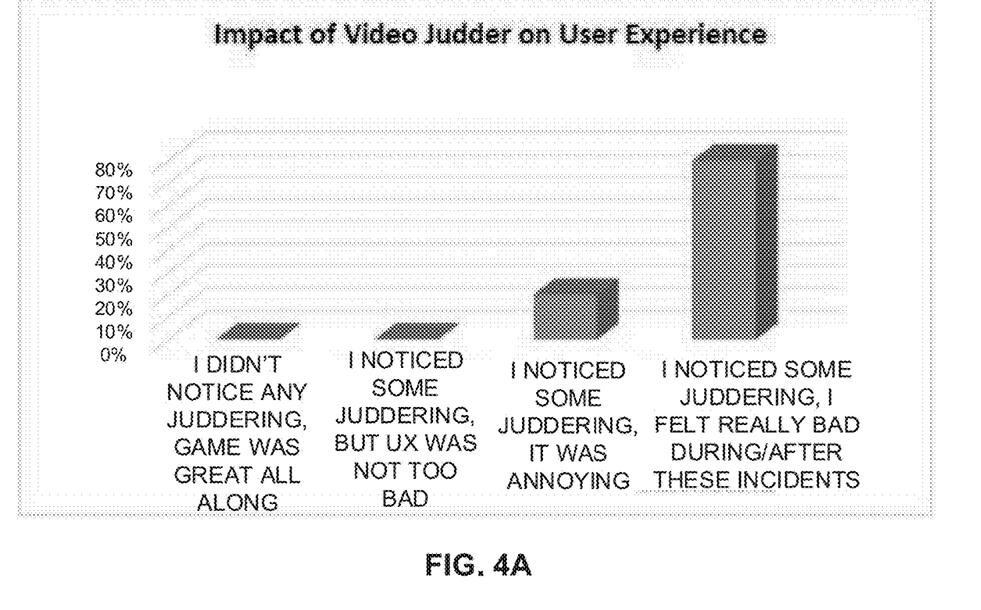
FIG. 4A is chart showing example impact of video juddering on a user experience.
Figure 4B:
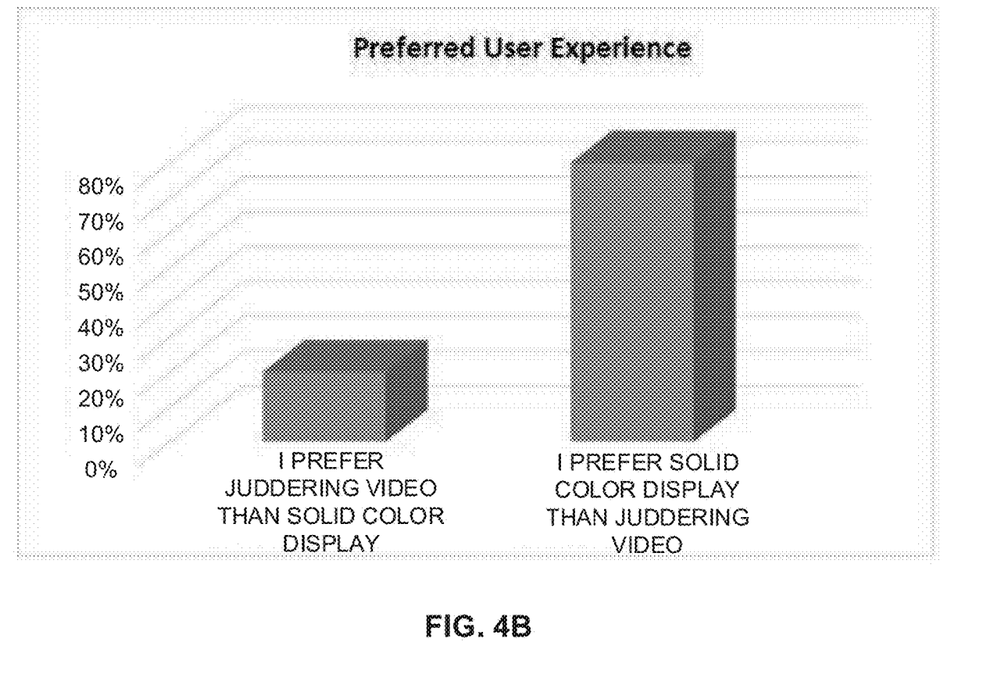
FIG. 4B is a chart showing example preferred user experience.

FIG. 4A is chart showing example impact of video juddering on a user experience (UX) based on actual data gathered during a real user study. As shown in FIG. 4A, when there is unsmooth video including, for example, juddering, nearly all users experienced discomfort from annoyance to physically not feeling well (i.e., feeling disoriented, dizzy, and nauseous and/or experiencing motion sickness). FIG. 4B shows that after unsmooth video is replaced with alternative video data (e.g., a solid color frame), the user experience was improved for the vast majority of users.

While an example manner of implementing the system 100 for preventing motion sickness in virtual reality environments is illustrated in FIG. 1, one or more of the elements, processes and/or devices illustrated in FIG. 1 may be combined, divided, re-arranged, omitted, eliminated and/or implemented in any other way. Further, the example GPU 104, the example encoder 106, the example clock 108, the example transceiver 110, the example receiver 116, the example clock 118, the example decoder 120, the example selector 122, the example video analyzer 124, the example video library 126, the example output display 128, and/or, more generally, the example host 102 or the example head-mount display 114 of FIG. 1 may be implemented by hardware, software, firmware and/or any combination of hardware, software and/or firmware. Thus, for example, any of the example GPU 104, the example encoder 106, the example clock 108, the example transceiver 110, the example receiver 116, the example clock 118, the example decoder 120, the example selector 122, the example video analyzer 124, the example video library 126, the example output display 128, and/or, more and/or, more generally, the example host 102 or the example head-mount display 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example GPU 104, the example encoder 106, the example clock 108, the example transceiver 110, the example receiver 116, the example clock 118, the example decoder 120, the example selector 122, the example video analyzer 124, the example video library 126, and/or the example output display 128, is/are hereby expressly defined to include a non-transitory computer readable storage device or storage disk such as a memory, a digital versatile disk (DVD), a compact disk (CD), a Blu-ray disk, etc. including the software and/or firmware. Further still, the example system 100 for preventing motion sickness in virtual reality environments of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
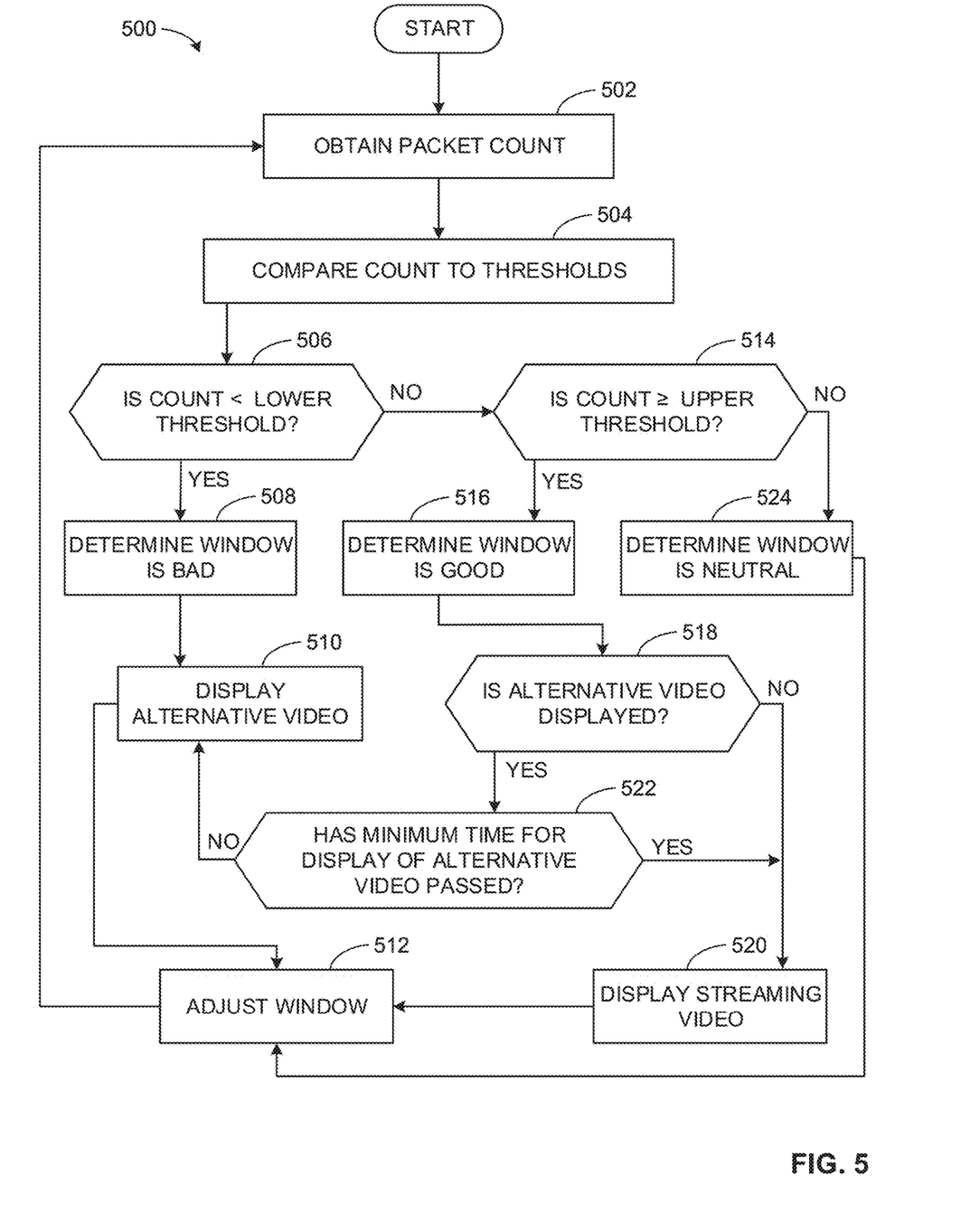
FIG. 5 is a flowchart representative of machine readable instructions which may be executed to implement elements of the example head-mounted display of FIG. 1.

A flowchart representative of example hardware logic, machine readable instructions, hardware implemented state machines, and/or any combination thereof for implementing the head-mounted display 114 of FIG. 1 is shown in FIG. 5. The machine readable instructions may be an executable program or portion of an executable program for execution by a computer processor such as the processor 1012 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example the head-mounted display 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program 500 of FIG. 5 includes the video analyzer 124 of the head-mounted display 114 obtaining a packet count indicating a number of video packets arrived in-time (i.e., within a latency budget) at the receiver 116 of the head-mounted display 114 (block 502) in a time window. The packet count can be determined based on data received at the receiver 116, activity of the decoder 120, and/or activity or characteristics of the wireless link 112 as disclosed above.

The video analyzer 124 compares the packet count to thresholds (block 504). In this example, the video analyzer 124 compares the packet count to a lower threshold and an upper threshold. In other examples, other number of thresholds may be used. The video analyzer 124 determines if the packet count is less than the lower threshold (block 506). If the packet count is less than the lower threshold, the video data received in the time window is insufficient for producing smooth video. Thus, the video analyzer 124 determines that the window is a bad window (block 508). The video data corresponding to a bad window will produce juddering, frozen images, and/or video with other unsmooth characteristics.

If a window is determined to be bad, the selector 122 replaces the video data in the bad window with alternative video data received from the video library 126 and communicates the alternative video data to the output display 128 to display the alternative video (block 510). The alternative video is displayed for a minimum amount of time such as, for example, a sufficient amount of time to enable additional video packets to arrive at the head-mounted display 114 in-time to meet a low latency requirement for the display of smooth video.

The video analyzer 124 adjusts the time window (block 512), and the example process 500 continues with the video analyzer 124 obtaining the packet count for the next time window (block 502).

As disclosed above, the video analyzer 124 compares the packet count to thresholds (block 504) and determines if the packet count is less than the lower threshold (block 506). If the packet count is not less than the lower threshold (i.e., the packet count is equal to or greater than the lower threshold), the video analyzer 124 determines if the packet count is greater than or equal to an upper threshold (block 514). If the packet count is greater than or equal to the upper threshold, the video data received in the time window is received in-time and is sufficient for producing smooth video. Thus, the video analyzer 124 determines that the window is a good window (block 516).

When the video analyzer 124 determines that the packet count for a time window is sufficient to produce smooth video, the selector 122 determines if alternative video (e.g., a solid color frame) is displayed at the output display 128 of the head-mounted display 114 (block 518). If alternative video is not being displayed on the output display 128, the selector 122 selects (or continues to select) the streaming video data for display (i.e., unmodified stream of video data) (block 520). The program 500 continues with the video analyzer 124 adjusting the time window (block 512) and obtaining the packet count for the next time window (block 502).

When the video analyzer 124 determines that the packet count for a time window meets the upper threshold and is sufficient to produce smooth video (block 514) and, thus is a good window (block 516), and the selector 122 determines that alternative video (e.g., a solid color frame) is displayed at the output display 128 of the head-mounted display 114 (block 518), the selector 122 determines if the alternative video has been displayed for a minimum amount of time (block 522). If the alternative video has not been displayed for a minimum amount of time, the selector 122 continues to communicate the alternative video to the output display 128 for display (block 510). The program 500 continues with the video analyzer 124 adjusting the time window (block 512) and obtaining the packet count for the next time window (block 502).

If the selector 122 determines that alternative video has been displayed for a minimum amount of time (block 522), the selector 122 switches the video data to cause the output display 128 to display the streaming video data (i.e., the unmodified video data) (block 520). The program 500 continues with the video analyzer 124 adjusting the time window (block 512) and obtaining the packet count for the next time window (block 502).

As disclosed above, the video analyzer 124 compares the packet count to thresholds (block 504) and determines if the packet count is less than the lower threshold (block 506). If the packet count is not less than the lower threshold (i.e., the packet count is equal to or greater than the lower threshold), the video analyzer 124 determines if the packet count is greater than or equal to an upper threshold (block 514). If the packet count meets the lower threshold but is not greater than nor equal to the upper threshold, the video data received in the time window is not received with an acceptable amount of latency to ensure smooth video but also will not necessarily cause unsmooth video. Thus, the video analyzer 124 determines that the window is a neutral window (block 524). For a neutral window, the selector 122 makes no changes to the display.

The program 500 continues with the video analyzer 124 adjusting the time window (block 512) and obtaining the packet count for the next time window (block 502).

Figure 6:
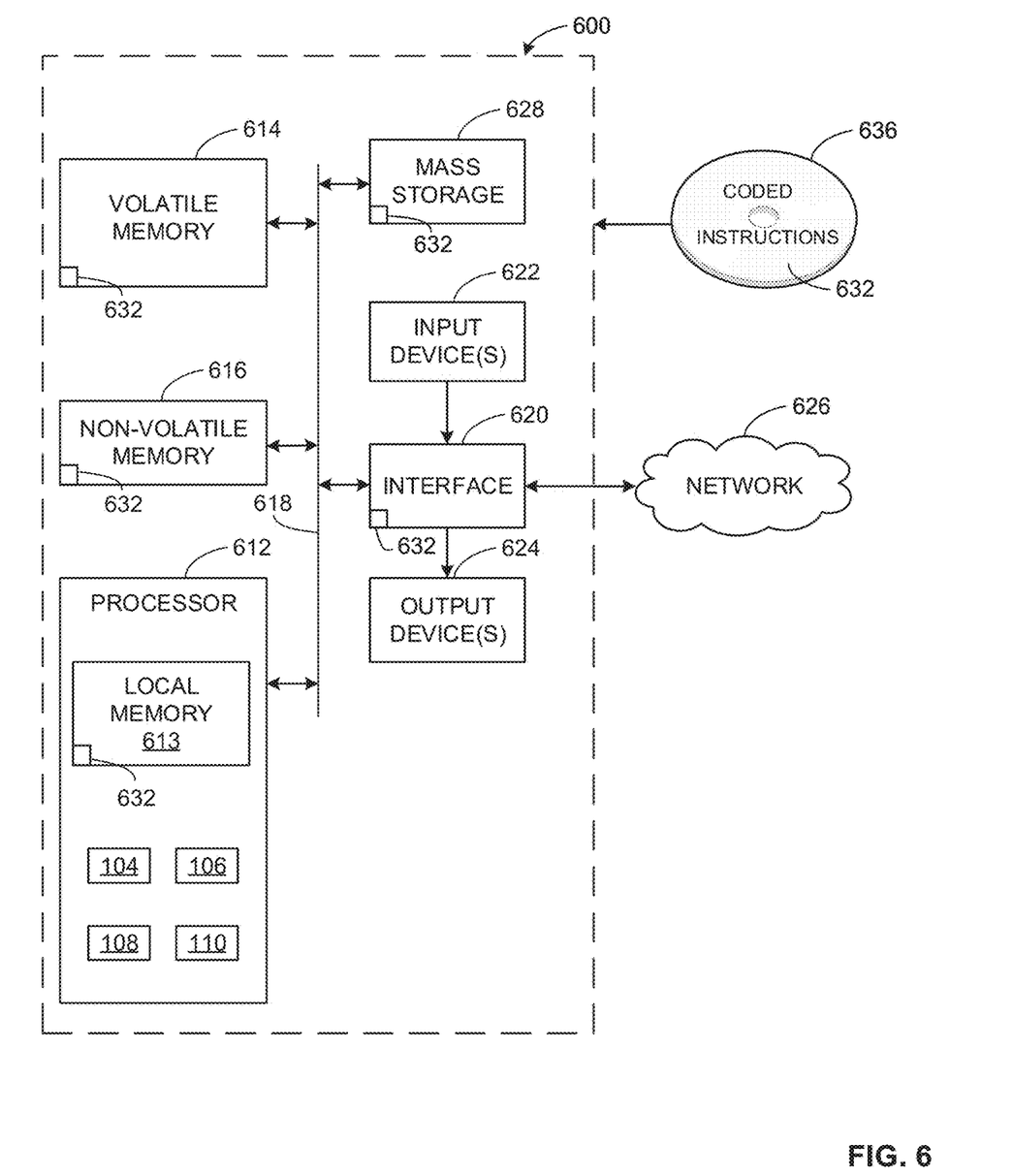
FIG. 6 is a block diagram of an example processing platform structured to implement the example host of FIG. 1.
Figure 7:
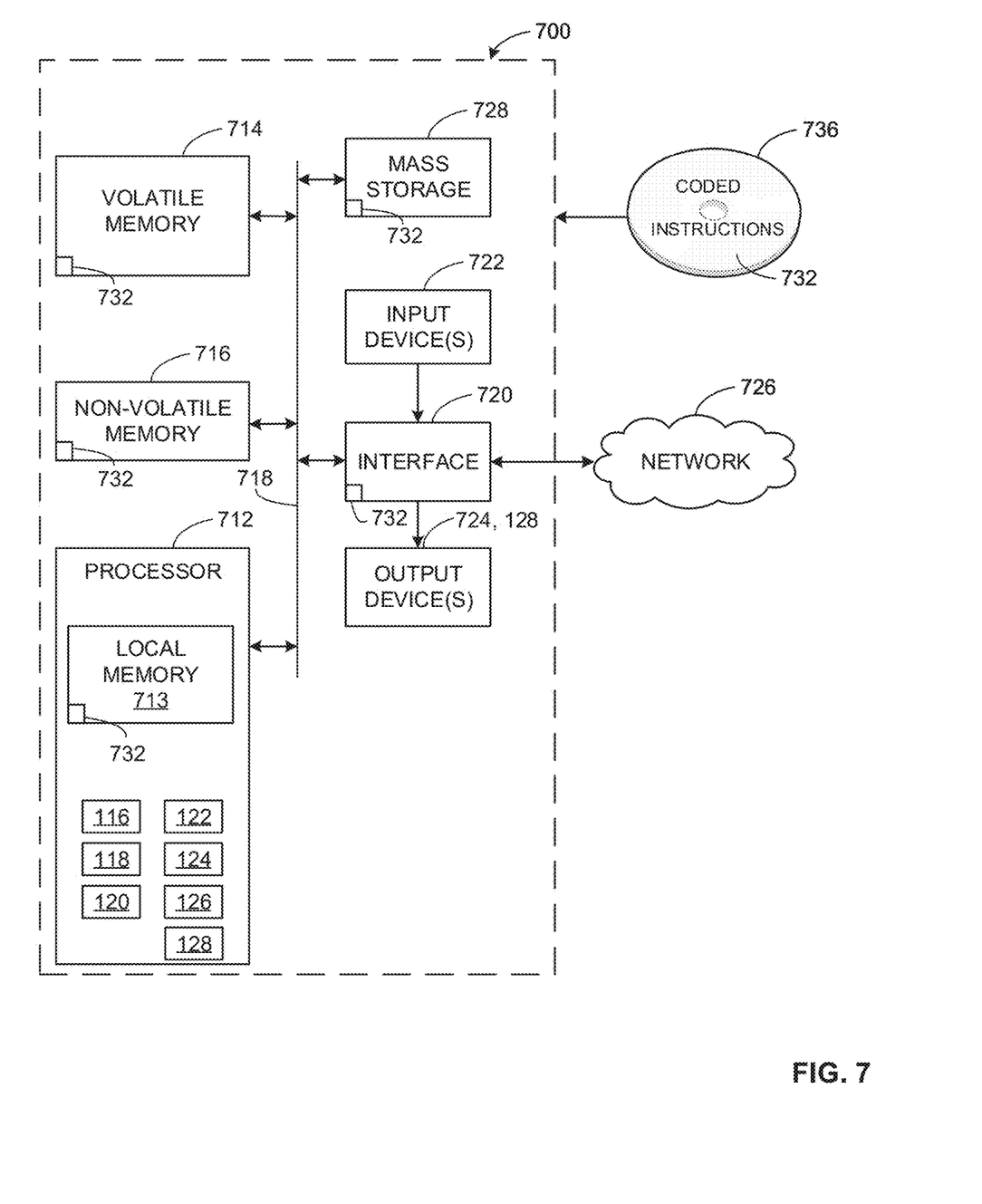
FIG. 7 is a block diagram of an example processing platform structured to execute the instructions of FIG. 5 to implement the example head-mounted display of FIG. 1.

FIG. 6 is a block diagram of an example processor platform 600 structured to implement the host 102 of FIG. 1. FIG. 7 is a block diagram of an example processor platform 700 structured to execute the instructions of FIG. 5 to implement the head-mounted display 114 of FIG. 1. The processor platforms 600, 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platforms 600, 700 of the illustrated example include respective processors 612, 712. The processors 612, 712 of the illustrated examples are hardware. For example, the processors 612, 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the GPU 104, the encoder 106, the clock 108, and the transceiver 110. Also, in this example, the processor 712 implements the receiver 116, the clock 118, the decoder 120, the selector 122, the video analyzer 124, the video library 126, and the output display 128 (or a portion of the output display 128).

The processors 612, 712 of the illustrated examples includes a respective local memory 613, 713 (e.g., a cache). The processors 612, 712 of the illustrated examples are in communication with a respective main memory including a volatile memory 612, 714 and a non-volatile memory 616, 716 via respective busses 618, 718. The volatile memory 614, 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616, 716 may be implemented by flash memory and/or any other desired type of memory device. Access to the main memory 614, 616, 714, 716 is controlled by a memory controller.

The processor platforms 600, 700 of the illustrated examples also include a respective interface circuit 620, 720. The interface circuit 620, 720 may be implemented by any type of interface standard, such as an Ethernet interface, a universal serial bus (USB), a Bluetooth® interface, a near field communication (NFC) interface, and/or a PCI express interface.

In the illustrated examples, one or more input devices 622, 722 are connected to the respective interface circuits 620, 720. The input devices 622, 722 permit a user to enter data and/or commands into the respective processors 612, 712. The input device can be implemented by, for example, an audio sensor, a microphone, a camera (still or video), a keyboard, a button, a mouse, a touchscreen, a track-pad, a trackball, isopoint and/or a voice recognition system.

One or more output devices 624, 724 are also connected to the respective interface circuits 620, 720 of the illustrated examples. The output devices 624, 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuits 620, 720 of the illustrated examples, thus, typically include a graphics driver card, a graphics driver chip and/or a graphics driver processor.

The interface circuits 620, 720 of the illustrated examples also include a communication device such as a transmitter, a receiver, a transceiver, a modem, a residential gateway, a wireless access point, and/or a network interface to facilitate exchange of data with external machines (e.g., computing devices of any kind) via respective networks 626, 726. The communication can be via, for example, an Ethernet connection, a digital subscriber line (DSL) connection, a telephone line connection, a coaxial cable system, a satellite system, a line-of-site wireless system, a cellular telephone system, WiGig (IEEE 802.11ad/IEEE 802.11ay), WiFi, etc.

The processor platforms 600, 700 of the illustrated examples also include one or more mass storage devices 628, 728 for storing software and/or data. Examples of such mass storage devices 628, 728 include floppy disk drives, hard drive disks, compact disk drives, Blu-ray disk drives, redundant array of independent disks (RAID) systems, and digital versatile disk (DVD) drives.

The machine executable instructions 632, 732 and the example program 500 of FIG. 5 may be stored in the mass storage devices 628, 728, in the volatile memory 614, 714, in the non-volatile memory 616, 716, and/or on a removable non-transitory computer readable storage medium such as a CD or DVD.

From the foregoing, it will be appreciated that example apparatus, systems, articles of manufacture, and methods have been disclosed that process video to remove elements that may cause motion sickness in virtual reality environments. Alternative video such as, for example, a solid color display replaces unsmooth video caused by data transmission latency issues. A solid color display provides a better user experience than the unsmooth video (such as, for example, juddering and/or frozen images) or the redisplaying of prior video frames. A solid color display does not have a focus plane, and a user in a virtual reality environment does not experience a misalignment of user movement with movement (or lack of movement) shown on a display in the head-mounted display during the display of the solid color frames. The user experience is enhanced because the users experience less motion sickness or other discomfort when exposed to the alternative display (e.g., the solid color) than the user would experience during the latency issues (i.e., the unsmooth video).

In addition, examples disclosed herein operate on the head-mounted display side. An advantage of running an algorithm, such as a standalone algorithm, on the head-mounted display side is that wireless link may break and the head-mounted display will continue to detect unsmooth video without having to receive instructions from the host side over-the-air.

The disclosed systems, devices, methods, apparatus, and articles of manufacture improve the efficiency of using a computing device by replacing unsmooth video created by computer communication latency issues to enhance a user experience. The disclosed methods, apparatus and articles of manufacture are accordingly directed to one or more improvement(s) in the functioning of a computer and/or computing system.

In addition, the solutions disclosed herein help alleviate concerns that original equipment manufacturers and/or users may have with deploying and/or using wireless virtual reality systems due to usage of potentially unreliable transport layers provided by third parties. Furthermore, the solutions disclosed herein for may also be supplemented or enhanced with increased support for video latency to prevent unsmooth video.

Disclosed herein are example systems, apparatus, articles of manufacture, and methods for processing video in virtual reality environments. Example 1 includes a virtual reality display device to process video in a virtual reality environment, the device includes a video analyzer to detect unsmooth video data in a stream of video data and a video library to provide alternative video data. The device of Example 1 also includes a selector to receive the stream of video data, an indication of the unsmooth video data, and the alternative video data. The selector also is to select the alternative video data to replace the unsmooth video data based on the indication of the unsmooth video data and output a modified stream of video data including the stream of video data with the alternative video data in place of the unsmooth video data. The device of Example 1 also includes an output display to display the modified stream of video data.

Example 2 includes the device of Example 1, wherein the alternative video data is to create a solid color display when displayed.

Example 3 includes the device of Example 1, wherein the video analyzer is to detect unsmooth video based on comparing a number of video packets arriving in-time in the video stream per a time interval with an estimated number of video packets expected in that time interval.

Example 4 includes the device of Example 3, wherein the estimated number is based on one or more of a transport layer latency budget, video resolution, encoder compression rate, or a number of frames per second.

Example 5 includes the device of Example 1, wherein the video analyzer is to detect unsmooth video data based on comparing a number of video packets arriving in the video stream per a time interval to a first threshold and a second threshold, the second threshold different than the first threshold.

Example 6 includes the device of Example 5, wherein the video analyzer is to detect unsmooth video data when the number of video packets arriving in-time in the video stream is less than the first threshold.

Example 7 includes the device of Example 5, wherein the video analyzer is to detect smooth video data when the number of video packets arriving in-time in the video stream is greater than or equal to the second threshold.

Example 8 includes the device of Example 1, wherein after a threshold amount of time and when the video analyzer detects smooth video data, the selector to output the stream of video data without the alternative video data.

Example 9 includes the device of Example 1, wherein the output display is to cover an entire field of view of a user.

Example 10 includes the device of Example 1, wherein unsmooth video data includes video data delivered outside of a latency constraint to cause the display to output one or more of a frozen image or video juddering.

Example 11 includes a virtual reality display device to process video in a virtual reality environment, the device including means for detecting unsmooth video data in a stream of video data and a video library to provide alternative video data. The device of Example 11 also includes means for selecting data by: receiving the stream of video data, an indication of the unsmooth video data, and the alternative video data; selecting the alternative video data to replace the unsmooth video data based on the indication of the unsmooth video data; and outputting a modified stream of video data including the stream of video data with the alternative video data in place of the unsmooth video data. The device of Example 11 also includes means for displaying the modified stream of video data.

Example 12 includes the device of Example 11, wherein the alternative video data is to create a solid color display when displayed.

Example 13 includes the device of Example 11, wherein the means for detecting is to detect unsmooth video based on comparing a number of video packets arriving in the video stream in latency less than or equal to transport layer latency budget per a time interval with an estimated number of video packets expected in that time interval.

Example 14 includes the device of Example 13, wherein the estimated number of video packets expected in that time interval is based on a combination of video frames per second, video encoder estimated output packets size, and transport layer packet sizes.

Example 15 includes the device of Example 11, wherein the means for detecting is to detect unsmooth video data based on comparing a number of video packets arriving in the video stream per a time interval to a first threshold and a second threshold, the second threshold different than the first threshold.

Example 16 includes the device of Example 15, wherein the means for detecting is to detect unsmooth video data when the number of video packets arriving in-time in the video stream is less than the first threshold.

Example 17 includes the device of Example 15, wherein the means for detecting is to detect smooth video data when the number of video packets arriving in-time in the video stream is greater than or equal to the second threshold.

Example 18 includes the device of Example 11, wherein after a threshold amount of time and when the means for detecting detects smooth video data, the means for selecting is to output the stream of video data without the alternative video data.

Example 19 includes the device of Example 11, wherein the means for displaying is to cover an entire field of view of a user.

Example 20 includes the device of Example 11, wherein unsmooth video data includes video data delivered outside of a latency constraint to cause the display to output one or more of a frozen image or video juddering.

Example 21 includes a non-transitory computer readable storage medium that includes computer readable instructions that, when executed, cause one or more machines to, at least: detect unsmooth video data in a stream of video data; provide alternative video data; receive the stream of video data, an indication of the unsmooth video data, and the alternative video data; select the alternative video data to replace the unsmooth video data based on the indication of the unsmooth video data; and output a modified stream of video data including the stream of video data with the alternative video data in place of the unsmooth video data.

Example 22 includes the storage medium Example 21, wherein the alternative video data is to create a solid color display when displayed.

Example 23 includes the storage medium Example 21, wherein the instructions further cause the one or more machines to detect unsmooth video based on comparing a number of video packets arriving in-time in the video stream per a time interval with an estimated number of video packets expected in that time interval.

Example 24 includes the storage medium Example 23, wherein the estimated number is based on one or more of a transport layer latency budget, video resolution, encoder compression rate, or a number of frames per second.

Example 25 includes the storage medium Example 21, wherein the instructions further cause the one or more machines to detect unsmooth video data based on comparing a number of video packets arriving in-time in the video stream per a time interval to a first threshold and a second threshold, the second threshold different than the first threshold.

Example 26 includes the storage medium Example 25, wherein the instructions further cause the one or more machines to detect unsmooth video data when the number of video packets arriving in-time in the video stream is less than the first threshold.

Example 27 includes the storage medium Example 25, wherein the instructions further cause the one or more machines to detect smooth video data when the number of video packets arriving in the video stream is greater than or equal to the second threshold.

Example 28 includes the storage medium Example 21, wherein after a threshold amount of time and when the one or more machines detect smooth video data, the instructions further cause the one or more machines to output the stream of video data without the alternative video data.

Example 29 includes the storage medium Example 21, wherein the output is to cover an entire field of view of a user.

Example 30 includes the storage medium Example 21, wherein unsmooth video data includes video data delivered outside of a latency constraint to cause a display to output one or more of a frozen image or video juddering.

Example 31 includes a method to process video in a virtual reality environment, the method includes detecting unsmooth video data in a stream of video data and providing alternative video data. The method of Example 31 also includes receiving the stream of video data, an indication of the unsmooth video data, and the alternative video data. In addition, the method of Example 31 includes selecting the alternative video data to replace the unsmooth video data based on the indication of the unsmooth video data and outputting a modified stream of video data including the stream of video data with the alternative video data in place of the unsmooth video data.

Example 32 includes the method Example 31, wherein the alternative video data is to create a solid color display when displayed.

Example 33 includes the method Example 31 and further includes detecting unsmooth video based on comparing a number of video packets arriving in the video stream in latency less than or equal to transport layer latency budget per a time interval with an estimated number of video packets expected in that time interval.

Example 34 includes the method Example 33, wherein the estimated number of video packets expected in that time interval is based on a combination of video frames per second, video encoder estimated output packets size, and transport layer packet sizes.

Example 35 includes the method Example 31, and further includes detecting unsmooth video data based on comparing a number of video packets arriving in-time in the video stream per a time interval to a first threshold and a second threshold, the second threshold different than the first threshold.

Example 36 includes the method Example 35, and further includes detecting unsmooth video data when the number of video packets arriving in-time in the video stream is less than the first threshold.

Example 37 includes the method Example 35, and further includes detecting smooth video data when the number of video packets arriving in-time in the video stream is greater than or equal to the second threshold.

Example 38 includes the method Example 31, wherein after a threshold amount of time and after detecting smooth video data, the method further includes outputting the stream of video data without the alternative video data.

Example 39 includes the method Example 31, and further includes covering an entire field of view of a user with the output of modified video stream data.

Example 40 includes the method Example 31, wherein unsmooth video data includes video data delivered outside of a latency constraint to cause a display to output one or more of a frozen image or video juddering.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A virtual reality display device to process video in a virtual reality environment, the device comprising:
    a video analyzer to:
        compare a number of video packets that arrive in a stream of video data per a plurality of time intervals to a first threshold and a second threshold, the second threshold different than the first threshold;
        detect unsmooth video data when the number of video packets that arrived in-time in the stream is less than the first threshold; and
        detect smooth video data when the number of video packets that arrived in-time in the stream is greater than or equal to the second threshold;
    a video library including a frame of video that is a solid color frame; and
    a selector to:
        select the solid color frame to replace the unsmooth video data in response to an indication of the unsmooth video data, the solid color frame to create a solid color display when displayed,
        insert the solid color frame into the stream of video data, and
        output a modified stream of video data including the stream of video data with the solid color frame in place of the unsmooth video data;
    when the video analyzer detects smooth video data after (1) the video analyzer detected unsmooth video data, and (2) the selector output or started to output the modified stream of video data including the stream of video data with the solid color frame for the unsmooth video,
    the selector is to output the modified stream of video data including the stream of video data with the solid color frame for a threshold amount of time before outputting the stream of video data without the solid color frame.

2. A device as defined in claim 1, wherein the video analyzer is to detect unsmooth video by comparing a number of video packets which arrived in-time in the video stream per a time interval with an estimated number of video packets expected in that time interval.

3. A device as defined in claim 2, wherein the estimated number is based on one or more of a transport layer latency budget, video resolution, encoder compression rate, or a number of frames per second.

4. A device as defined in claim 1, further including an output display to display the modified stream of video data, wherein the output display is to cover an entire field of view of a user.

5. A device as defined in claim 1, wherein the unsmooth video data includes video data delivered outside of a latency constraint to cause a display of one or more of a frozen image or video juddering.

6. A virtual reality display device to process video in a virtual reality environment, the device comprising:
    means for detecting unsmooth video data in a stream of video data, the means for detecting to:
        compare a number of video packets that arrive in the stream per a plurality of time intervals to a first threshold and a second threshold, the second threshold different than the first threshold;
        detect unsmooth video data when the number of video packets that arrived in-time in the stream is less than the first threshold;
        detect smooth video data when the number of video packets that arrived in-time in the stream is greater than or equal to the second threshold;
        classify respective time intervals of the plurality of time intervals in a first category when the number of video packets that arrive during the respective time intervals is less than the first threshold;
        classify respective time intervals of the plurality of time intervals in a second category when the number of video packets that arrive during the respective time interval is greater than or equal to the second threshold; and
        classify respective time intervals of the plurality of time intervals in a third category when the number of video packets that arrive during the respective time interval is great than or equal to the first threshold and less than the second threshold;
    a video library including a plurality of frames of video that are solid color frames; and
    means for selecting video to:
        select the solid color frames to replace the unsmooth video data, the solid color frames to create a solid color display when displayed,
        insert the solid color frames into the stream of video data, and
        output a modified stream of video data including the stream of video data with solid color frames in place of the unsmooth video data;
    when the means for detecting detects one or more time intervals classified in the third category after (1) the means for detecting detects unsmooth video data, and (2) the means for selecting video output or started to output the modified stream of video data including the stream of video data with the solid color frame for one or more time intervals classified in the first category, the means for selecting video continues to output the modified stream of video data including the stream of video data with the solid color frame.

7. A device as defined in claim 6, wherein the means for detecting is to detect unsmooth video by comparing a number of video packets which arrived in the video stream with a latency less than or equal to a transport layer latency budget per a time interval with an estimated number of video packets expected in that time interval.

8. A device as defined in claim 7, wherein the estimated number of video packets expected in that time interval is based on a combination of video frames per second, video encoder estimated output packets size, and transport layer packet sizes.

9. A device as defined in claim 6, the threshold amount of time being a first threshold amount of time, and after a second threshold amount of time that the means for detecting has detected smooth video data, the means for outputting is to output the stream of video data without the alternative video data.

10. A device comprising:
memory; and
a processor to execute instructions to at least:
compare a number of video packets that arrive in a stream of video data per a plurality of time intervals to a first threshold and a second threshold, the second threshold different than the first threshold;
detect unsmooth video data when the number of video packets which arrived in-time in the stream is less than the first threshold;
detect smooth video data when the number of video packets that arrived in-time in the stream is greater than or equal to the second threshold;
select alternative video data to replace the unsmooth video data, the alternative video data including a solid color frame to create a solid color display when displayed;
insert the solid color frame into the stream of video data;
output a modified stream of video data including the stream of video data with the alternative video data in place of the unsmooth video data; and
when the processor detects smooth video data after (1) detecting unsmooth video data, and (2) outputting or starting to output the modified stream of video data including the stream of video data with the solid color frame for the unsmooth video,
the processor is to output the modified stream of video data including the stream of video data with the alternative video data in place of the unsmooth video data for a threshold amount of time before outputting the stream of video data without the alternative video data.

11. The device of claim 10, wherein the processor is to detect the unsmooth video by comparing a number of video packets which arrived in-time in the video stream in a time interval with an estimated number of video packets expected in that time interval.

12. The device of claim 11, wherein the estimated number is associated with one or more of a transport layer latency budget, video resolution, encoder compression rate, or a number of frames per second.

13. A device as defined in claim 1, wherein the solid color display includes a plurality of frames of a solid color.

14. A device as defined in claim 1, wherein the solid color display lacks a focus plane.

15. A device as defined in claim 1, wherein the solid color display includes a same color at multiple locations of the display.

16. A device as defined in claim 1, wherein the solid color frames is a first solid color frame of a first color, the video library including a second solid color frame of a second color, and
the selector to select the second solid color frame for presentation to indicate a malfunction of the device.

17. A device as defined in claim 1, wherein the time intervals partially overlap.

18. A virtual reality display device to process video in a virtual reality environment, the device comprising:
a video analyzer to:
compare a number of video packets that arrive in a stream of video data per a plurality of time intervals to a first threshold and a second threshold, the second threshold different than the first threshold;
detect unsmooth video data when the number of video packets that arrived in-time in the stream is less than the first threshold;
detect smooth video data when the number of video packets that arrived in-time in the stream is greater than or equal to the second threshold;
classify respective time intervals of the plurality of time intervals in a first category when the number of video packets that arrive during the respective time intervals is less than the first threshold;
classify respective time intervals of the plurality of time intervals in a second category when the number of video packets that arrive during the respective time interval is greater than or equal to the second threshold; and
classify respective time intervals of the plurality of time intervals in a third category when the number of video packets that arrive during the respective time interval is great than or equal to the first threshold and less than the second threshold;
a video library including a plurality of frames of video that are solid color frames; and
a selector to:
select the solid color frame to replace the unsmooth video data in response to an indication of the unsmooth video data, the solid color frame to create a solid color display when displayed,
insert the solid color frame into the stream of video data, and
output a modified stream of video data including the stream of video data with the solid color frame in place of the unsmooth video data;
when the video analyzer detects one or more time intervals classified in the third category after (1) the video analyzer detects unsmooth video data, and (2) the selector outputs or starts to output the modified stream of video data including the stream of video data with the solid color frame for one or more time intervals classified in the first category,
the selector continues to output the modified stream of video data including the stream of video data with the solid color frame.

* * * * *